United States Patent [19]

Schlosser et al.

[11] Patent Number: 5,027,788
[45] Date of Patent: Jul. 2, 1991

[54] BARBECUE KETTLE CART

[75] Inventors: Erich J. Schlosser, Barrington; J. Michael Alden, Palatine, both of Ill.

[73] Assignee: Weber-Stephen Products Co., Palatine, Ill.

[21] Appl. No.: 566,147

[22] Filed: Aug. 10, 1990

[51] Int. Cl.[5] .................................. A47J 37/00
[52] U.S. Cl. .................................. 126/25 R; 126/30; 126/276; 220/85 CH
[58] Field of Search .............. 126/25 R, 41 R, 30, 126/25 C, 37 B, 39 B, 276, 37 A; 99/484; 312/236, 249; 220/379, 85 CH, 85 H

[56] References Cited

U.S. PATENT DOCUMENTS

| D. 214,220 | 5/1969 | verHalen | D7/334 |
|---|---|---|---|
| 2,484,239 | 10/1949 | Moon et al. | 126/25 R |
| 2,780,474 | 2/1957 | Farah et al. | 126/25 R |
| 2,907,316 | 10/1959 | Windust | 126/9 R |
| 3,081,592 | 3/1963 | Sorensen | 126/9 R |
| 3,866,994 | 2/1975 | Bonin | 126/25 R |
| 4,635,613 | 1/1987 | Tucker et al. | 126/41 R |
| 4,677,964 | 7/1987 | Lohmeyer et al. | 126/41 R |
| 4,688,541 | 8/1987 | Stephen et al. | 126/25 R |

Primary Examiner—James C. Yeung
Attorney, Agent, or Firm—Wallenstein, Wagner & Hattis, Ltd.

[57] ABSTRACT

An improved cart (50) for holding a barbecue kettle (10) is disclosed. The kettle (10) is supported by a pair of opposed side brackets (67) that are fastened on each side to a horizontal upper side member (53). The cart (50) has a tray assembly that includes a removable tray (70) resting on a sliding cradle (72) disposed between the upper side support members (53) that is movable between an opened and closed position. A closable storage bin (80) with an inclined bottom (81) is disposed between the upper side support members (53) and below the sliding cradle (72) and is accessible when the sliding cradle (72) is in an opened position. The cart (50) further includes a work surface adjacent the kettle (10) and between the upper side support members (53) and a shelf (95) for holding additional items disposed below the storage bin (80) and between the two side support structures (52).

7 Claims, 2 Drawing Sheets

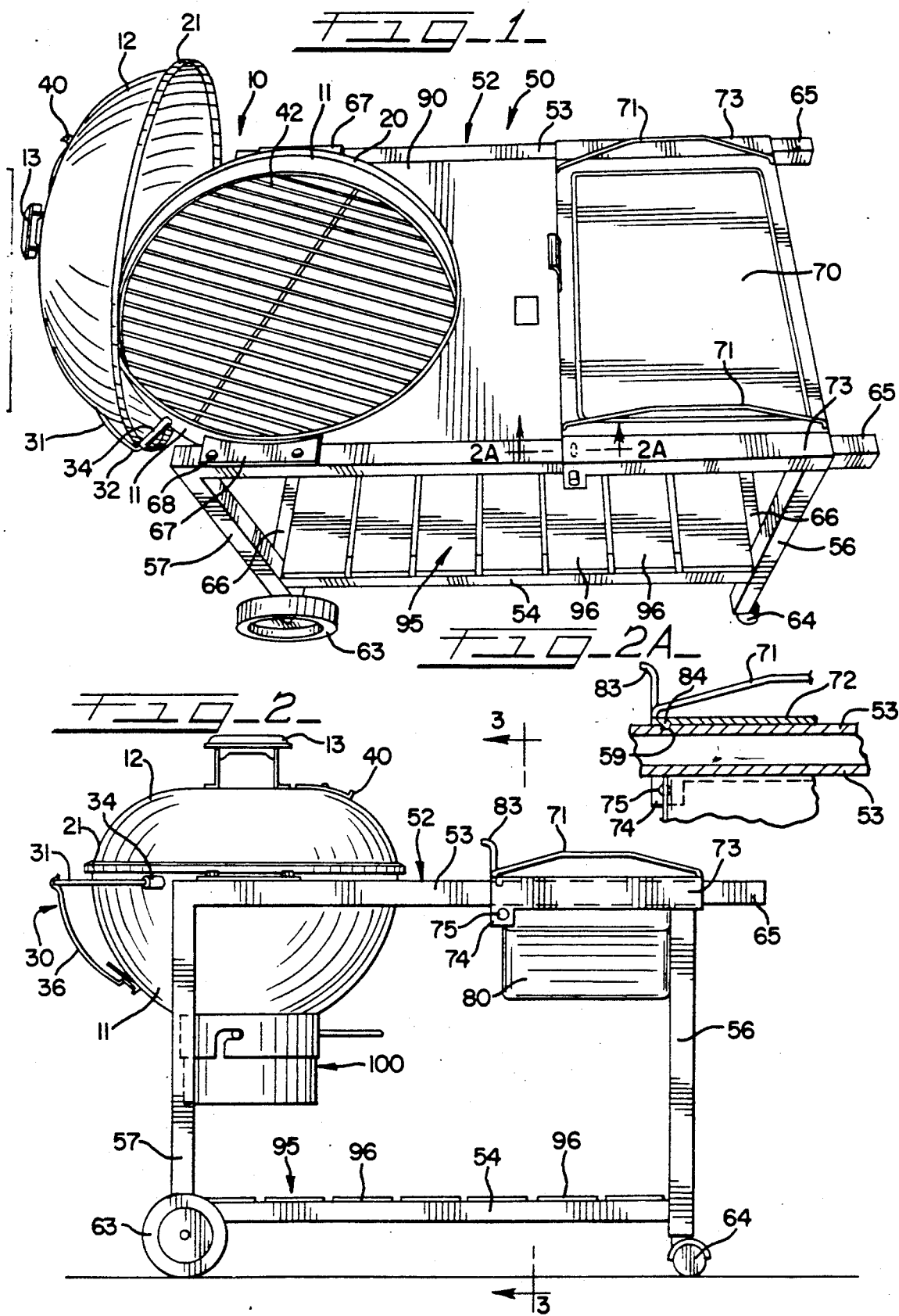

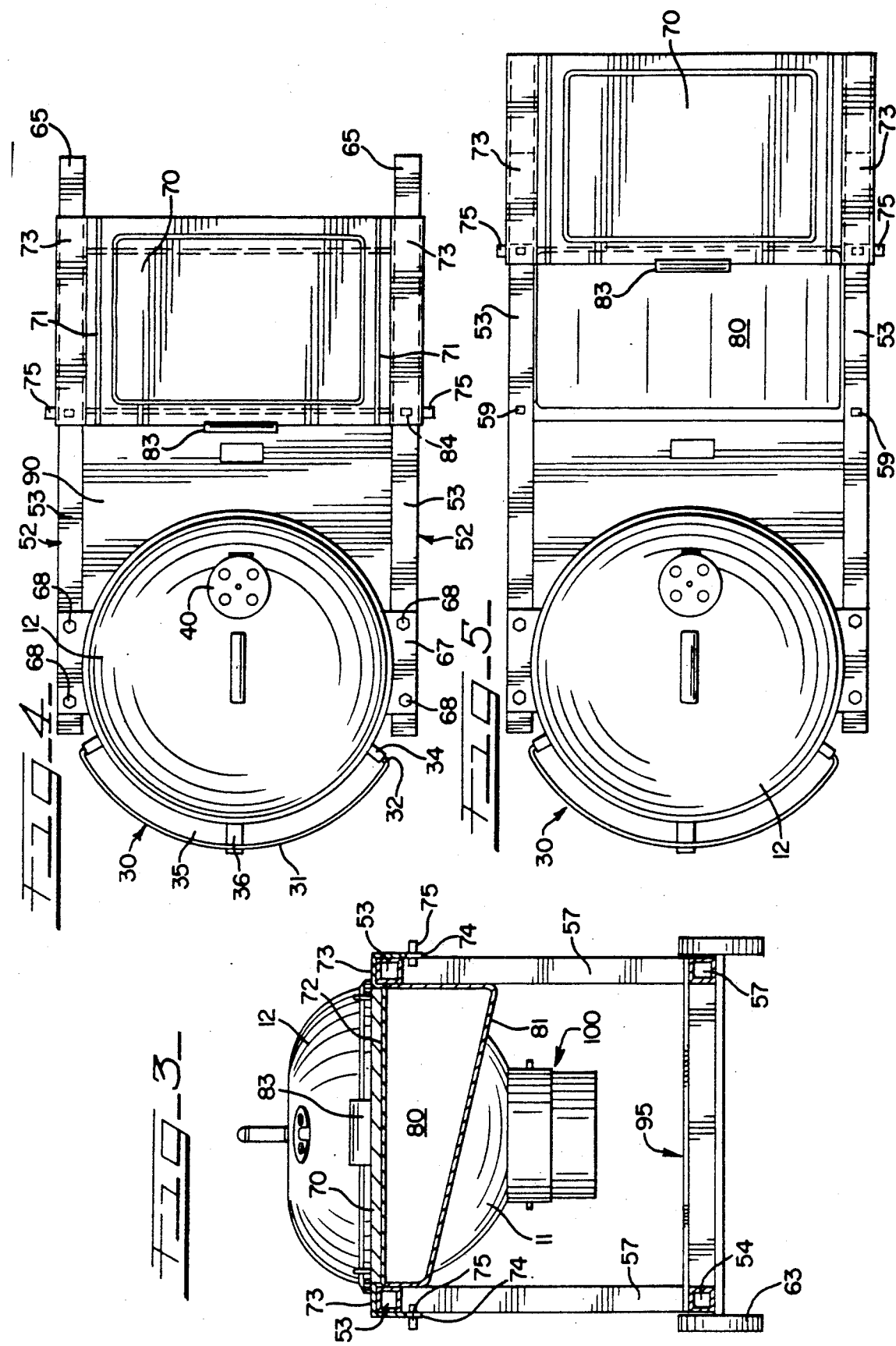

BARBECUE KETTLE CART

BACKGROUND PRIOR ART

Kettle-type grills are very widely used today. Presently, one of the most popular grills is being marketed by the Assignee of the present invention. This barbecue kettle consists of a generally semi-hemispherical bottom bowl that has a circular open top with a cooking grid slightly below the upper rim of the bowl. A generally semi-hemispherical top cover can be placed on the bottom bowl. Most often, the bowl is supported on a tripod leg arrangement or a center post arrangement. The kettle configuration with and without the tripod arrangement is a registered trademark of the Assignee of the present invention.

Barbecue kettles that are designed for burning charcoal as a fuel also have a second grid for supporting the charcoal below the cooking surface. Both the bowl and cover have vent openings to provide the necessary oxygen for combustion of the charcoal while the cover is closed.

One type of barbecue kettle that has received very favorable acceptance by consumers is disclosed in U.S. Pat. Re. No. 33,091, owned by the Assignee of the present invention, which is sold under the registered trademark ONE-TOUCH ®.

In an effort to provide adequate work area around the grill, various types of carts have been proposed that define the work surface surrounding the kettle and also provide a storage area for essential components normally used in the cooking process.

Moreover, many times it is desirable to have the cover or lid partially shield the cooking surface or grid, such as for outdoor cooking in extremely high windy conditions. Various mechanisms have been proposed for providing a work surface around a circular grill and also for providing shielding devices for shielding the cooking surface. One such mechanism is disclosed in U.S. Pat. No. 4,635,613, owned by the Assignee of the present invention, which shows a novel rectangular cart designed to support a circular gas grill and provides working surfaces on opposite sides of the grill.

Another mechanism is disclosed in U.S. Pat. No. 4,688,541, also owned by the Assignee of the present invention, which shows a work surface attached to the bowl of a kettle. However, Applicants are constantly striving for obtaining a better unit which is attractive in appearance and also is functionally-desirable.

SUMMARY OF THE INVENTION

According to the present invention, an improved cart for holding a barbecue kettle, a tray assembly, a storage bin, an additional work surface, and a lower shelf includes two parallel side support structures or rails. Each of the side support structures has a generally horizontal upper side member and a generally horizontal lower side member connected by a pair of vertical posts. The front vertical post connects one end of both side members together. The rear vertical post is connected to the other end of the horizontal lower side member and near the other end of the horizontal upper side member. Thus, an extension for gripping the cart is formed out of the upper side member rearwardly of said connection with said rear vertical post.

The side support structures are connected to one another near their bottoms by parallel transverse crossmembers connected to the vertical posts.

A pair of opposed side brackets are fastened to each of the horizontal upper side members and the kettle for supporting the kettle that is disposed therebetween.

According to one aspect of the invention, the cart includes a tray assembly that is disposed between the horizontal upper side support members and movable between an opened and closed position. This tray assembly includes a removable tray with grips that rests on a sliding cradle. The cradle has a bent end portion with a flange and a glide therein at each side thereof that cooperate with each horizontal upper side support member. The glides prevent the cradle from inadvertently sliding off or separating from the upper side members. For example, in the open position, each glide contacts the rear vertical post to prevent any further rearwardly sliding of the tray assembly.

According to another aspect of the present invention, for holding fuel, tongs and the like, the cart further includes a closable storage bin that is disposed between the two parallel horizontal upper side support members and below the sliding cradle. Preferably the bottom surface of the bin is inclined to aid in identifying and manipulating the contents therein and for better drainage therefrom.

The tray assembly acts as a cover for this storage bin so that the interior of the bin is accessible when the sliding cradle with the tray thereon are in the open position. A latching mechanism is also provided to lock the sliding cradle in the closed position. And, a cradle handle is connected to the sliding cradle to aid the maneuvering of the tray assembly.

According to a further aspect of the present invention, a work surface is provided adjacent the kettle and between the horizontal upper side support members. And, the cart can include a lower shelf for holding additional items under the kettle, storage bin and tray assembly.

Other advantages and aspects of the present invention will become apparent upon reading the following description of the drawings and detailed description of the invention.

BRIEF DESCRIPTION OF DRAWINGS

FIG. 1 is a perspective top view of a barbecue kettle and the improved cart made in accordance with the teachings of the present invention;

FIG. 2 is a side view of the improved cart and the barbecue kettle attached to it;

FIG. 2A is a cross-sectional view of the cradle and horizontal side support member along line 2A—2A of FIG. 1;

FIG. 3 is a cross-sectional view of the barbecue kettle and improved cart along line 3—3 of FIG. 2;

FIG. 4 is a top view of the barbecue kettle and the improved cart with the sliding tray in the closed position; and, FIG. 5 is a top view of the barbecue kettle and the improved cart with the sliding tray in the open position.

DETAILED DESCRIPTION

While this invention is susceptible of embodiment in many different forms, there is shown in the drawings and will herein be described in detail a preferred embodiment of the invention with the understanding that the present disclosure is to be considered as an exemplification of the principles of the invention and is not intended to limit the broad aspect of the invention to embodiment illustrated.

FIG. 1 of the drawings shows a kettle-type barbecue grill, generally designated by the reference numeral 10, that is of a well-known configuration and has been sold by the Assignee of the present invention for years. It comprises a generally semi-hemispherical bottom bowl 11 and a generally semi-hemispherical, removable cover 12. The bowl 11 has an upper edge or lip 20, while the cover 12 has a sealing rim 21. The rim 21 is dimensioned to fit snugly around the lip 20 so that a substantially air-tight seal is developed between the bowl 11 and the cover 12. The bowl and cover are preferably formed from porcelain-coated enamel. A handle 13 is provided at the top of the cover 12. The kettle 10 is generally constructed in accordance with the teachings of U.S. Pat. No. 4,416,248, which is incorporated herein by reference. However, since the kettle 10 is supported by the improved cart of the present invention, a tripod leg arrangement is not necessary.

As shown generally in the figures, the kettle 10 also includes a cover holder 30 which is attached to the exterior of the bottom 11 to hold the cover 12 while the kettle is opened. This cover holder 30 is generally made in accordance with the one taught in U.S. Pat. No. 4,777,927, which is also incorporated herein by reference. Specifically, the cover holder 30 includes a generally circular rod 31 having opposite end portions 32 extending at right angles from the arcuate center portion. The end portions 32 have a flattened portion that acts as an abutment extending through openings in the bowl, being secured thereto by nuts (not shown) received on the threaded portions of ends 32. A pair of nonmetallic nylon rollers 34 are rotatably supported on the bent end portions 32. The arcuate circular rod 31 thus defines a generally arcuate slot 35 (FIG. 4) adjacent the upper peripheral edge of the bowl and is configured to receive the cover 12.

The cover holder 30 also includes an elongated strap 36 connected at one end to the rod 31 at the center thereof, and connected at the other end to the bowl 11 by a bolt (not shown).

A shutter-type damper 40 is rotatably secured to the cover 12 and employed to control the air flow through openings (not shown) in the cover, which is conventional in present commercial grills. A support grid (not shown) is placed within the kettle and spaced a short distance above the bottom of the bowl to hold the solid fuel (such as charcoal briquettes), which are burned in the barbecuing procedure. Spaced above the support grid and below the bowl's upper lip 20 there is a cooking grid 42 on which to place the food being cooked.

An ash catcher 100 can be attached to the bottom 11 of the kettle 10. The ash catcher 100 is constructed in accordance with the teachings of a co-pending application, Ser. No. 571,736, filed 8/23/90. Also, an ash disposal damper system (not shown) can be installed in the bottom 11 of the kettle 10. A very successful damper system incorporated herein by reference is disclosed in U.S. Pat. No. 4,416,248, which is also owned and marketed by the Assignee of the present invention.

As shown in FIG. 1, the circular kettle bottom 11 is supported on a cart, generally designated with the reference numeral 50. The cart 50 includes a frame structure with a removable tray 70 that can act as a working surface, a storage bin 80 for placing contents in, and a shelf 95 for putting miscellaneous items on. An additional working surface 90 can be located between the kettle's bowl 11 and the removable tray structure 70.

The structure supporting the kettle 10 is a frame, generally made of rectangular metal tubing, that includes two identical and parallel side support structures 52 that are connected to each other near their bottoms by two transverse cross-members 66. Each side support 52 is composed of a horizontal upper side member 53 and a parallel horizontal lower side member 54. These horizontal side members 53,54 are connected to each other by a pair of parallel vertical posts 56,57. Specifically, the top end of the front vertical post 57 connects to the upper side member 53, and near the bottom end, connects to the lower side member 54. A wheel 63 is attached at the bottom of the front vertical post 57. Similarly, the top end of rear vertical post 56 connects to the upper side member 53, and near the bottom end, connects to the lower side member 54. A caster 64 is attached at the bottom of the rear vertical post 56.

Two parallel, horizontal transverse cross-members 66 connect the corresponding vertical posts 56,57 of each side support structure 52 together. One transverse cross-member 66 connects the front posts 57 together, and the other transverse cross-member 66 connects the rear posts 56 together. As shown in the figures these connections are near the bottom of the vertical posts 56,57 such that the transverse cross-members 66 are at about the same level as the lower side members 54.

The assembly is sized so that it is at a height for an individual working on the tray 70 or cooking on the cooking grid 42 can do so comfortably while standing up. Specifically, while standing, an individual has easy access to all of the parts of the kettle 10 and the cart 50.

As to the connections, they are preferably made such that the posts and members are flush so that no sharp points or projections are exposed which could hurt a person or mar a surface. However, in the preferred embodiment the horizontal upper side member 53 and rear vertical post 56 are connected near the end of the upper side member 53 so as to make a T-intersection, forming an extension 65 of the upper side member 53 rearwardly of this connection. This extension 65 can be used as a gripping handle for pushing or otherwise maneuvering the cart 50.

Towards the front end of the cart 50, the semi-hemispherical bottom bowl 11 of the kettle 10 is connected to the two side supports 52 by side brackets 67. Each side bracket 67 has two legs and is generally L-shaped, with one leg fastened to each horizontal upper side member 53 by fasteners 68 and, with the other leg fastened (not shown) to the bottom bowl 11 of the kettle 10. As shown in the figures, specifically FIGS. 1, 4 and 5, the side brackets 67 are generally arcuate so as to follow the generally circular external contour of the bowl 11 and attach to the bowl 11 at diametrically-opposed points on the bowl 11 adjacent the lip 20.

Towards the rear of the cart 50, there is a removable tray 70 with parallel grips 71 that is disposed between the side supports 52. This tray 70 rests directly in a cradle 72. The cradle 72, shown in cross-section in FIGS. 2A and 3, has two opposed bent end portions 73 that cooperate with the horizontal upper side members 53. Particularly, each bent end portion 73 slides on top of the upper side member 53 it contacts. In this manner, the tray 70 and cradle 72 are movable between an opened and closed position and act as a cover for the storage bin 80.

To prevent the cradle 72 holding the tray 70 from inadvertently sliding off or separating from the upper side members 53, each bent end portion 73 includes a flange 74 with a glide 75 therein. The glide 75 extends partially under the upper side member 53. Thus, while the cradle 72 is stationary or being moved, the flange 74 holds the glide 75 below the upper side member 53 which prevents the cradle 72 from being lifted off the upper side member 53. Further, when the cradle 72 is slid rearwardly on the upper side member 53, the glide 75 will contact the rear vertical post 56 and prevent the cradle 72 from sliding off the upper side member 53.

As shown in detail FIGS. 2 through 5, a storage bin 80 is positioned below the removable tray 70 and sliding cradle 72 and is disposed between the side supports 52. This storage bin 80 is connected to the upper side members 53 by conventional means known in the art. The storage bin 80 has side walls and end walls and is closed on the bottom. As shown specifically in FIG. 3, the bin 80 preferably has an inclined bottom 81.

It has been found that having this inclined bottom surface 81 aids in storing, obtaining and working with items, such as bags of charcoal. For example, a bag of charcoal is easier to store on such an incline 81 in that it is less likely to spill and scatter briquettes all over the bin. Moreover, having the deepest portion of the bin 80 closest to the cook, facilitates unloading a bag of briquettes. The cook need not have to pick up the bag and to remove its contents; rather, the cook can just pivot the resting bag up off the inclined bottom surface 81 to a standing position and remove its briquettes. Further, the incline bottom 81 makes portions of items more visible to an individual standing next to the improved cart 50. By way of illustration, if a barbecue utensil is placed into the bin 80 for safe storage, an individual might have to bend over the cart 50 and the bin 80 to peer inside to find the utensil. However, with the inclined design, a portion of the utensil would be visible without the necessity of bending and peering. This makes for safer cooking if, for example, the conditions around the kettle are smokey or the heat emanating from the kettle great. Finally, an inclined bin bottom 81 aids in draining the storage bin 80 should liquid, such as rain water, enter the bin 80. A hole can be located in bottom 81 at the deepest point to facilitate the flow of the liquid therefrom.

The sliding cradle 72 supporting the tray 70 acts as a cover for the storage bin 80. As illustrated in FIGS. 4 and 5, the cradle 72 and tray 70 have a closed position (FIG. 4) where they totally cover the bin 80, and an open position (FIG. 5) where they expose the bin 80 for access therein. As noted previously, in the open position, the glides 75 come in contact with the rear vertical posts 56.

A latching mechanism is further provided to lock the cradle 72 in the closed position. Detailed in FIG. 2A, each bent end portion 73 of the cradle 72 has a knob 83 that cooperates with a recess 59 in each upper side member 53. In the closed position, the knobs 84 sit inside the cooperating recesses 59. Conversely, in all other positions of the cradle 72, the knobs 84 are not in contact with the recesses 59. A cradle handle 83 is attached to the cradle 72 to aid in moving the cradle 72 up, down or to the side. For example, when the cradle 72 is in the closed position and the knobs 84 are situated in the recesses, the cradle handle 83 is lifted to simultaneously separate each knob 84 from its respective recess 85 permitting sliding of the cradle 72 to the open position. Similarly, the handle 83 can be pushed in a direction towards the kettle 10 to close the bin 80 top 72. Disposed between the removable tray 70 and the bottom of the kettle 11 is an additional working surface 90 fastened at each side to an upper side member 53. Additional items can be placed on this additional working surface 90. Also, by having an additional working surface 90 flush with the kettle bowl 11 at one end, and flush with the sliding cradle 72 at the other end, the cart 50 can be more easily be kept clean in that items, including grease, will not fall between any parts.

For additional storage space, the cart 50 of the present invention includes a storage shelf 95. This storage shelf is composed of a plurality of slats 96 fastened to the horizontal lower side members 54.

While the specific embodiments have been illustrated and described, numerous modifications come to mind without significantly departing from the spirit of the invention and the scope of protection is only limited by the scope of the accompanying claims.

We claim:

1. An improved cart for holding a separate barbecue kettle comprising:
   means for supporting the barbecue kettle, a tray assembly and a storage bin at a working and an accessible height, said tray assembly disposed above said storage bin and acting as a slidable cover therefor, said supporting means including horizontal side members connected by cross-members;
   means for fixedly securing the separate kettle between said horizontal side members;
   means for repeatably sliding said tray assembly on said horizontal side members to an open position to access said storage bin and to a closed position to cover said storage bin; and,
   means for locking said tray assembly in a closed position.

2. An improved cart for holding a barbecue kettle comprising:
   a kettle support structure for supporting the barbecue kettle, a tray assembly and a storage bin at a working and an accessible height, said kettle support structure including two parallel side support structures, each side support structure including a horizontal upper side member and a horizontal lower side member connected thereto by a pair of vertical posts, said side support structures being connected to each other near their bottoms by transverse cross-members; and,
   a side bracket fastened to each said horizontal upper side member and to a side of the kettle that is disposed between said horizontal upper side members, said tray assembly being disposed above said storage bin and between said horizontal upper side support members, said tray assembly acting as a slidable cover to said bin and including a removably tray resting in a sliding cradle having a bent end portion at each side thereof cooperating with said horizontal upper side support member.

3. The improved cart as defined in claim 2 wherein the cart further includes a work surface adjacent the kettle and between said horizontal upper side support members.

4. An improved cart for holding a barbecue kettle comprising:
   a kettle support structure including two parallel side support structures, each side support structure including a horizontal upper side member and a horizontal lower side member connected by a pair of vertical posts, one said post being at one end of both said upper and lower horizontal side members, and another post being at the end of said horizontal lower side member and near the other end of said horizontal upper side member so as to form rearwardly of said connection an extension for gripping thereof, said side support structures being interconnected near the bottom by transverse cross-members connected to said vertical posts;

a pair of opposed side brackets fastened to each said horizontal upper side member and the kettle for supporting the kettle disposed therebetween;

a tray assembly disposed between said horizontal upper side support members, said tray assembly including a removable tray resting on a sliding cradle having a bent end portion with a flange and a glide therein at each side thereof cooperating with said horizontal upper side support member, said sliding cradle movable between an open position and a closed position, each said glide contacting a vertical post when said sliding cradle is in the open position; and, a closable storage bin disposed between said horizontal upper side support members and below said sliding cradle, said bin being accessible when said sliding cradle is in the open position.

5. The improved kettle cart as defined in claim 4 further includes a work surface adjacent said kettle and between said horizontal upper side support members.

6. The improved kettle cart as defined in claim 5 wherein the storage bin includes an inclined bottom surface.

7. The improved kettle cart as defined in claim 6 wherein the cart further includes a shelf for holding additional items disposed below said storage bin and between said side support structures.

* * * * *

UNITED STATES PATENT AND TRADEMARK OFFICE
CERTIFICATE OF CORRECTION

PATENT NO.  : 5,027,788

DATED       : July 2, 1991

INVENTOR(S) : Erich J. Schlosser et al.

It is certified that error appears in the above-identified patent and that said Letters Patent is hereby corrected as shown below:

Column 1, line 1, insert:

The present invention relates generally to kettle-type barbecue grills and, more particularly, to an improved cart for supporting the barbecue grill.

Column 6, lines 56-57, after "including a" delete "removably" and insert --removable--.

Signed and Sealed this

Twenty-third Day of March, 1993

Attest:

STEPHEN G. KUNIN

*Attesting Officer*   Acting Commissioner of Patents and Trademarks